United States Patent
Zhou et al.

(10) Patent No.: US 7,292,527 B2
(45) Date of Patent: Nov. 6, 2007

(54) RESIDUAL FREQUENCY ERROR ESTIMATION IN AN OFDM RECEIVER

(75) Inventors: Xu Zhou, Sunnyvale, CA (US); Chihming (Norman) Chen, Fremont, CA (US); Chih (Rex) Hsueh, Cupertino, CA (US); Orlando Canelones, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 902 days.

(21) Appl. No.: 10/727,670

(22) Filed: Dec. 5, 2003

(65) Prior Publication Data
US 2005/0122895 A1     Jun. 9, 2005

(51) Int. Cl.
*H04J 11/00* (2006.01)
(52) U.S. Cl. .................... 370/203; 370/260
(58) Field of Classification Search ............ None
See application file for complete search history.

(56) References Cited

U.S. PATENT DOCUMENTS

| | | | |
|---|---|---|---|
| 6,529,783 B1 | 3/2003 | Combelles et al. | |
| 2003/0227978 A1* | 12/2003 | Magee et al. | 375/260 |
| 2004/0004935 A1 | 1/2004 | Zhu et al. | |
| 2005/0105593 A1* | 5/2005 | Dateki et al. | 375/130 |
| 2005/0163238 A1* | 7/2005 | Fujii | 375/260 |
| 2006/0239370 A1* | 10/2006 | Mody et al. | 375/260 |
| 2006/0291578 A1* | 12/2006 | Singh et al. | 375/260 |

FOREIGN PATENT DOCUMENTS

GB    2 368 250    4/2002

OTHER PUBLICATIONS

Kapoor et al., "Pilot Assisted Synchronization for Wireless OFDM Systems Over Fast Time Varying Fading Channels", Vehicular Technology Conference, 1998, 48$^{th}$ IEEE Ottawa, Ontario, Canada, May 18-21, 1998, vol. 3, pp. 2077-2080, IEEE, New York.
Claβen et al., "Synchronization Algorithms for an OFDM System for Mobile Communication", Codierung Fur Quelle, Kanal und Ubertragung, Vortage Der ITG-Fahtagung Oct. 26-28, 1994, ITG Fachberichte, Berlin, DE Verlag, DE vol. 130, pp. 105-113.
IEEE Std. 802.11a-1999, "Part 11: Wireless LAN Medium Access Control (MAC) and Physical Layer (PHY) specifications: High-speed Physical Layer in the 5 GHZ Band", LAN/MAN Standards Committee of the IEEE Computer Society, IEEE-SA Standards Board, Approved Sep. 16, 1999, New York, USA.

* cited by examiner

*Primary Examiner*—Huy D. Vu
*Assistant Examiner*—Phuongchau Ba Nguyen
(74) *Attorney, Agent, or Firm*—Manelli Denison & Selter PLLC

(57) ABSTRACT

An OFDM receiver configured for measuring frequency error based on comparing prescribed pilot tones from a prescribed group of consecutive symbols in a received OFDM signal. A complex conjugate generator is configured for generating complex conjugates of the prescribed pilot tones of a first subgroup of the consecutive symbols. A multiplier is configured for generating a complex pilot product, for each symbol subgroup position, by multiplying the pilot tones of a second subgroup symbol at the corresponding symbol subgroup position with the respective complex conjugates of the first subgroup symbol at the corresponding symbol subgroup position. A complex summation circuit sums the complex pilot products of the symbol subgroup positions to obtain an accumulated complex value. A error calculator calculates the frequency error from the accumulated complex value for use in correcting frequency offset.

12 Claims, 4 Drawing Sheets

RESIDUAL FREQUENCY ERROR ESTIMATION IN AN OFDM RECEIVER

BACKGROUND OF THE INVENTION

1. Field of the Invention

The present invention relates to estimation of frequency error caused due to oscillator differences between an IEEE 802.11a based Orthogonal Frequency Division Multiplexing (OFDM) transmitter and an OFDM receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11 based OFDM PHY in hardware involves providing a cost-effective, compact device the can be implemented in smaller wireless devices. Hence, implementation concerns typically involve cost, device size, and device complexity.

FIG. 1 is a diagram of a typical direct conversion receiver. The direct conversion receiver 10 includes an antenna 12, a low noise amplifier 14, a local oscillator 16 tuned to a prescribed carrier frequency, mixers 18a and 18b, and lowpass channel filters 20a and 20b. As recognized in the art, I and Q channel signals are generated based on modulating a signal by a first carrier and a second carrier phase-shifted by $\pi/2$ (i.e., 90 degrees), respectively. The received signal is supplied to the mixers 18a and 18b. The mixer 18a outputs a first demodulated signal that includes the I component and a first carrier component (e.g., a sine wave); the mixer 18b, having received a phase-shifted carrier signal from the phase shifter 22, outputs a second demodulated signal that includes the Q component and a second carrier component (e.g., a cosine wave). The low pass filters 20a and 20b remove the respective carrier components and output the I and Q components, respectively.

A particular concern involves frequency differences ($f_E$) between the transmit frequency ($f_T$) generated by local crystal oscillator in the OFDM transmitter and the receive frequency ($f_R$) generated by the local crystal oscillator 16 in the OFDM receiver 10. The resulting frequency error ($f_E = f_T - f_R$) may cause substantial deterioration of the signal to noise ratio of left uncorrected.

The IEEE Standard 802.11 specifies a short preamble and a long preamble that may be used by the OFDM receiver 10 for generating an estimated frequency error ($f_{EST}$). In actual implementation, however, the estimated frequency error ($f_{EST}$) does not equal the actual frequency error ($f_E$) because both the short preamble and long preamble contain noise components from transmission between the OFDM transmitter and the OFDM receiver 10. Hence, the short preamble and long preamble received by the OFDM receiver differs from the short preamble and long preamble output by the OFDM transmitter.

Further, the short and long preamble output by the OFDM transmitter do not address frequency errors encountered due to oscillator drift, where the transmit frequency ($f_T$) and the receive frequency ($f_R$) independently vary over time. Hence, the difference between the estimated frequency error ($f_{EST}$) and the actual frequency error ($f_E$), referred to as residual frequency error ($f_{RES} = f_{EST} - f_E$), still will affect system performance and reduce the signal to noise ratio of the OFDM receiver.

SUMMARY OF THE INVENTION

There is a need for an arrangement that enables a direct conversion receiver to accurately estimate residual frequency error induced from noise components in a short preamble and a long preamble, and oscillator drift, to provide precise elimination of frequency errors between a direct conversion transmitter and the direct conversion receiver.

There also is a need for an arrangement in an OFDM receiver for estimating residual frequency error in a manner that is independent from any phase tracking system.

These and other needs are attained by the present invention, where an OFDM receiver has a frequency error detector configured for measuring frequency error based on comparing prescribed pilot tones from a prescribed group of consecutive symbols in a received OFDM signal. The prescribed group includes a first subgroup of the consecutive symbols and a second subgroup of the consecutive symbols. The first and second subgroups each have an equal number of symbol subgroup positions. The frequency error detector includes a complex conjugate generator, a multiplier, a complex summation circuit, and an error calculator. The complex conjugate generator is configured for generating complex conjugates of the prescribed pilot tones of the first subgroup of the consecutive symbols. The multiplier is configured for generating a complex pilot product, for each symbol subgroup position, by multiplying the pilot tones of a second subgroup symbol at the corresponding symbol subgroup position with the respective complex conjugates of the first subgroup symbol at the corresponding symbol subgroup position. The complex summation circuit sums the complex pilot products of the symbol subgroup positions to obtain an accumulated complex value. The error calculator calculates the frequency error from the accumulated complex value for use in correcting frequency offset.

One aspect of the present invention provides a method in an OFDM direct conversion receiver. The method includes receiving a prescribed group of consecutive symbols in a received OFDM signal, and identifying within the prescribed group a first subgroup of the consecutive symbols and a second subgroup of the consecutive symbols, the first and second subgroups each having an equal number of symbol subgroup positions. The method also includes generating complex conjugates of the prescribed pilot tones of the first subgroup of the consecutive symbols. A complex pilot product is generated, for each symbol subgroup position, by multiplying the pilot tones of a second subgroup symbol at the corresponding symbol subgroup position with the respective complex conjugates of a first subgroup symbol at the corresponding symbol subgroup position. The method also includes obtaining an accumulated complex value by summing the complex pilot products of the symbol subgroup positions, and calculating the frequency error from the accumulated complex value for use in correcting frequency offset.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11 OFDM transceiver, followed by a detailed description of the residual frequency error estimation according to an embodiment of the present invention.

Receiver Architecture Overview

Figure 1:
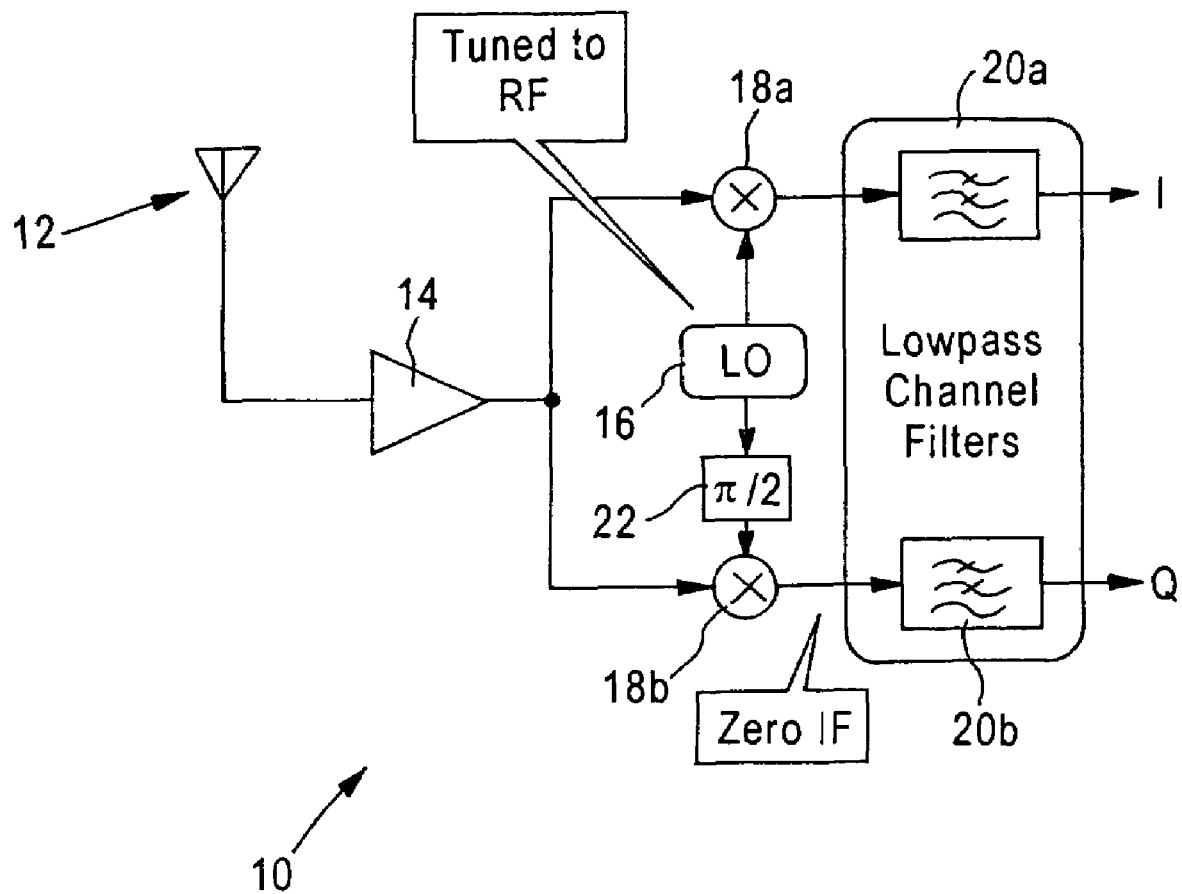
FIG. 1 is a diagram illustrating a conventional (PRIOR ART) direct conversion receiver configured for recovering I and Q components from a received IEEE 802.11 OFDM wireless signal.
Figure 2:
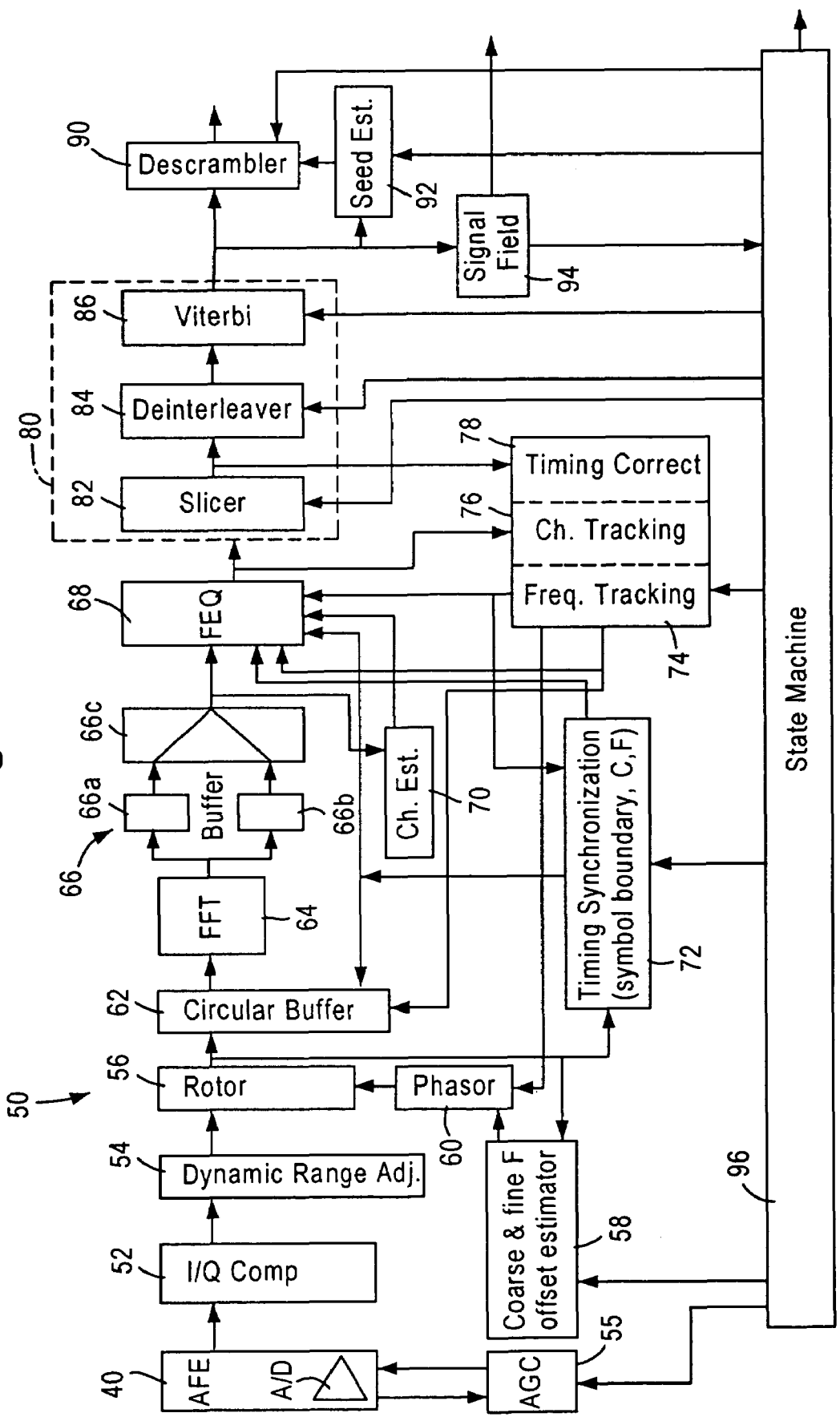
FIG. 2 is a diagram illustrating the receiver portion of an IEEE 802.11 OFDM transceiver according to an embodiment of the present invention.

FIG. 2 is a diagram illustrating an architecture of a receiver module 50 of an IEEE 802.11 Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11 preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11 specification.

The descrambler circuit 90 is configured for recovering the original serial bit stream from the decoded data, by descrambling a 127-bit sequence generated by the scrambler of the transmitter, according to the IEEE 802.11 specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11 compliant Media Access Controller (MAC).

Figure 3:
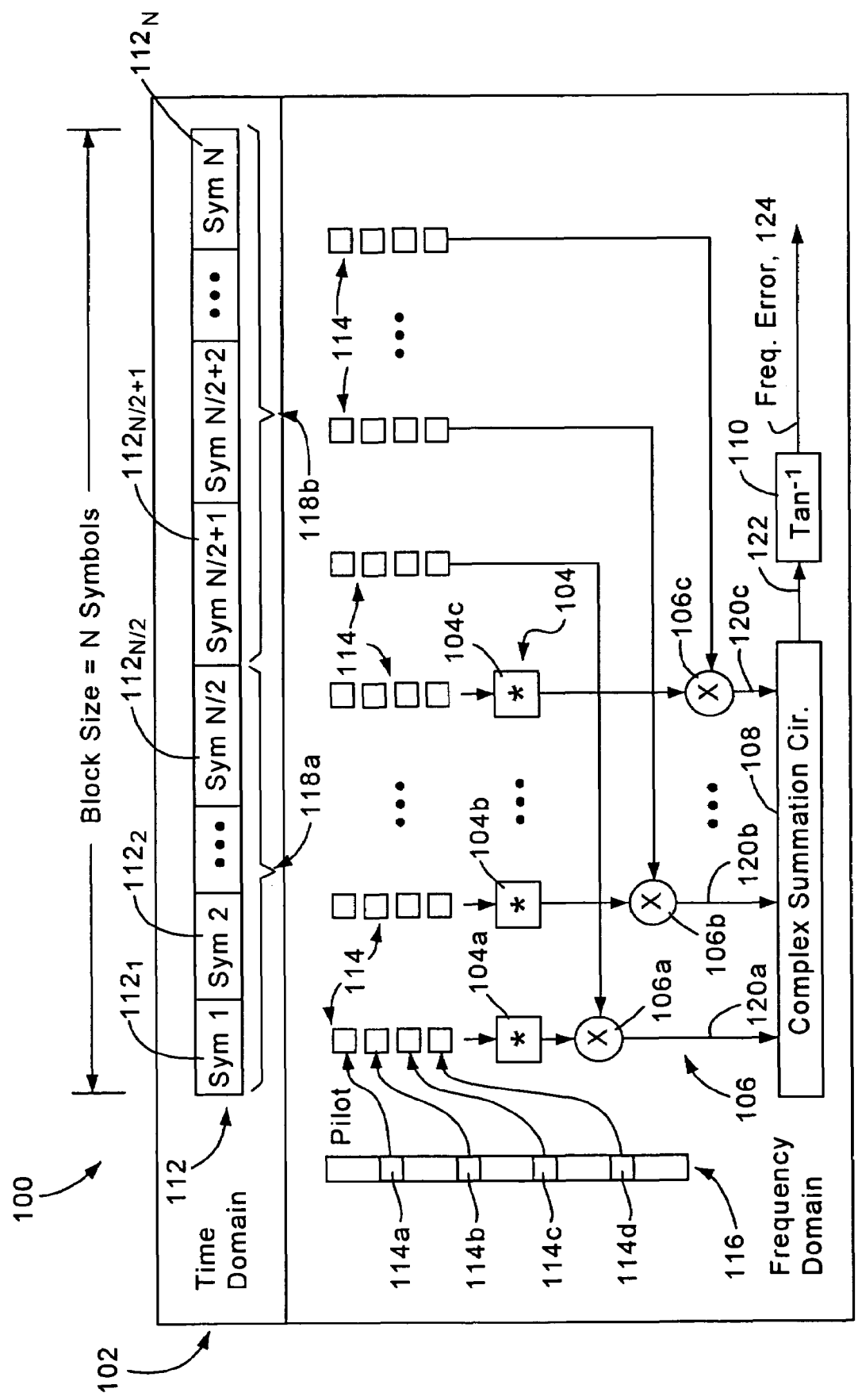
FIG. 3 is a block diagram illustrating a frequency error detector within the frequency tracking block of FIG. 2, according to an embodiment of the present invention.

Residual Frequency Error Estimation Based on Pilot Tones of Consecutive OFDM Symbols FIG. 3 is a block diagram illustrating a frequency error detector 100 within the frequency tracking block 74 of FIG. 2, according to an embodiment of the present invention. The frequency error detector 100 includes a buffer 102, a complex conjugate generator 104, a multiplier 106, a complex summation circuit 108, and an error calculator 110.

The frequency error detector 100 is configured for measuring frequency error (Freq. Error) based on determining phase differences between pilot tones over a period of time. In particular, the disclosed embodiment compares the pilot tones 114 within a prescribed group (N) of consecutive OFDM symbols 112 in order to derive an accurate frequency error estimation. As described above, each OFDM symbol 112 transmitted according to IEEE 802.11a protocol includes fifty-two (52) tones 116, which includes four (4) pilot tones 114a, 114b, 114c, and 114d.

In an ideal (i.e., theoretical) system, the pilot tones 114 for each of the symbols 112 should be identical. As described above, however, noise components and oscillator drift may cause residual frequency errors that may be undetectable by conventional frequency tracking systems.

According to the disclosed embodiment, the prescribed (N) group of consecutive symbols 112 (i.e., $112_I$ through $112_N$) are stored in the buffer 102 and divided into two first and second subgroups 118a and 118b, where each subgroup 118a and 118b has the same number of symbols N/2. In addition, each symbol has a corresponding subgroup position within its subgroup: in the case of subgroup 118a, the symbol $112_I$ (Sym1) is at position "1", the symbol $112_2$ (Sym2) is at position "2", and the symbol $112_{N/2}$ (SymN/2) is at position "N/2"; in the case of subgroup 118b, the symbol $112_{N/2-1}$ (SymN/2+1) is at position "1", the symbol $112_{N/2+2}$ (SymN/2+2) is at position "2", and the symbol $112_{N/2}$ (SymN/2) is at position "N/2". Hence, both symbols $112_I$ and $112_{N/2+1}$ have the same corresponding subgroup position of "1", the symbols $112_2$ and $112_{N/2+2}$ have the same corresponding subgroup position of "2", etc., ending with the symbols $112_{N/2}$ and $112_N$ sharing the last corresponding subgroup position of "N/2".

Hence, a comparison between symbols of the subgroups 118a and 118b that share the same corresponding subgroup position enables a uniform time-delayed evaluation between the pilot tones, the uniform time delay being N/2.

According to the disclosed embodiment, the complex representations of the pilot tones 114 (114a, 114b, 114c, 114d) (i.e., constellation values) are compared between N/2 OFDM symbols by multiplying the pilot tone 114 of a symbol from the second subgroup 118b with the complex conjugate (represented by "*") of the pilot from the corresponding symbol subgroup position of the first subgroup 118a, resulting in a phase difference. In particular, the complex conjugate generator 104 outputs the complex conjugates of the pilot tones 114 of the first subgroup 118a of the consecutive symbols to the multipliers 106.

The multipliers 106 (e.g., 106a) generate a complex pilot product 120 (e.g., 120a) for each symbol subgroup position (e.g., position "1") based on multiplying the pilot tones 114 (114a, 114b, 114c, 114d) from a second subgroup symbol (e.g., $112_{N/2+1}$) at the corresponding position with the complex conjugate output by the corresponding conjugate generator (e.g., 104a). The complex pilot product 120 represents the phase difference between the pilot tones 114 for the symbols separated by the interval N/2.

The complex products for all the symbol subgroup positions are accumulated (i.e., summed) by the complex summation circuit 108, resulting in an accumulated complex value 122. Also note that the different complex products 120a, 120b, etc., may cancel out noise components. The accumulated complex value 122 represents the accumulated phase difference. The frequency error 124 is obtained by the error calculator 110 calculating the inverse tangent of the accumulated complex value 122.

The frequency error can then be supplied to the frequency offset estimator 58 of FIG. 2 for frequency adjustment that eliminates the residual frequency error.

Figure 4:
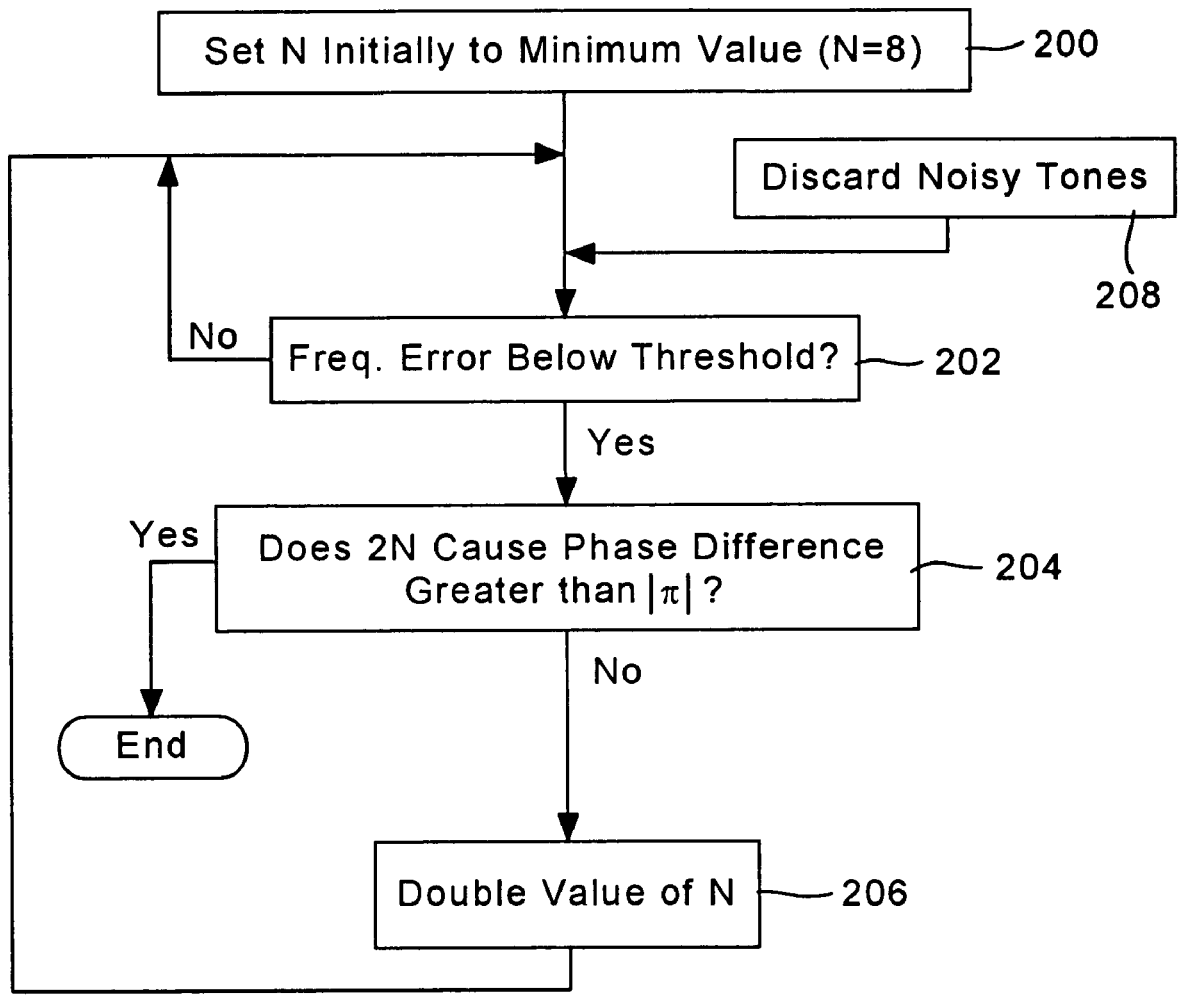
FIG. 4 is a diagram illustrating the method of calculating the frequency error, according according to an embodiment of the present invention.

FIG. 4 is a diagram illustrating the method by the state machine 96 of controlling the frequency error detector according to an embodiment of the present invention. The state machine 96 sets the value of N symbols to be stored and compared for generation of the frequency error 124. In particular, as the frequency offset is corrected over time, the residual frequency offset becomes more difficult to detect. Hence, the state machine 96 initially sets N in step 200 to a minimum value (e.g, N=8). If in step 202 the determined frequency error 124 is below a prescribed threshold (equivalent to an adjustment parameter in the estimator 58), and if in step 204 an increased value in N (e.g., 2N) does not result in a phase difference between the symbols Sym1 and SymN/2+1 greater than the absolute value of pi ($\pi$) the state machine doubles in step 206 the value of N. first controls the buffer 102 to store.

Note that additional refinements can be made to improve the accuracy of error frequency estimation by excluding in step 208 pilot tone samples 114 having an excessive amount of noise. In particular, the frequency tracking module 74 obtains channel quality information for the pilot tones (114a, 114b, 114c, 114d) from the FEQ 68 and Channel-Estimation module 70. If the estimated channel signal quality on any one of the pilot tones is worse than a pre-determined threshold, where the signal on that particular tone(s) is severely attenuated by the channel, resulting in a lower signal-to-noise ratio, the frequency estimation module 100 (under the control of the state machine 96) will discard the "noisy" tones and not sum the corresponding products of these tones with the remaining tones.

According to the disclosed embodiment, frequency tracking is improved by providing more accurate frequency error estimation as frequency error becomes smaller during frequency tracking convergence.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion receiver, the method including:

receiving a prescribed group of consecutive symbols in a received OFDM signal, and identifying within the prescribed group a first subgroup of the consecutive symbols and a second subgroup of the consecutive symbols, the first and second subgroups each having an equal number of symbol subgroup positions;

generating complex conjugates of the prescribed pilot tones of the first subgroup of the consecutive symbols;

generating a complex pilot product, for each symbol subgroup position, by multiplying the pilot tones of a second subgroup symbol at the corresponding symbol subgroup position with the respective complex conjugates of a first subgroup symbol at the corresponding symbol subgroup position;

obtaining an accumulated complex value by summing the complex pilot products of the symbol subgroup positions; and calculating the frequency error from the accumulated complex value for use in correcting frequency offset.

2. The method of claim 1, wherein the step of calculating the frequency error includes determining an inverse tangent of the accumulated complex value as the frequency error.

3. The method of claim 1, wherein the receiving step includes increasing a size of the prescribed group of consecutive symbols, and consequently the number of symbol subgroup positions, based on a determined reduction in the frequency error.

4. The method of claim 3, wherein the increasing includes increasing the size of the prescribed group of consecutive symbols while maintaining a phase difference in any one of the complex pilot products of up to an absolute value of pi ($\pi$).

5. The method of claim 4, wherein the receiving step includes initially setting the size of the prescribed group to eight (8) symbols.

6. The method of claim 1, wherein the receiving step includes selectively discarding at least one symbol having been determined as having a signal to noise ratio below a prescribed level.

7. An OFDM direct conversion receiver including:

a buffer configured for receiving a prescribed group of consecutive symbols in a received OFDM signal, the prescribed group including a first subgroup of the consecutive symbols and a second subgroup of the consecutive symbols, the first and second subgroups each having an equal number of symbol subgroup positions;

a complex conjugate generator configured for generating complex conjugates of the prescribed pilot tones of the first subgroup of the consecutive symbols;

a multiplier configured for generating a complex pilot product, for each symbol subgroup position, by multiplying the pilot tones of a second subgroup symbol at the corresponding symbol subgroup position with the respective complex conjugates of the first subgroup symbol at the corresponding symbol subgroup position;

a complex summation circuit configured for accumulating the complex pilot products of the symbol subgroup positions to obtain an accumulated complex value; and an error calculator configured for calculating the frequency error from the accumulated complex value for use in correcting frequency offset.

8. The receiver of claim 7, wherein the error calculator is configured for calculating the frequency error by determining an inverse tangent of the accumulated complex value.

9. The receiver of claim 7, further comprising a state machine configured for increasing a size of the prescribed group of consecutive symbols, and consequently the number of symbol subgroup positions, based on a determined reduction in the frequency error.

10. The receiver of claim 9, wherein the state machine is configured for increasing the size of the prescribed group of consecutive symbols while maintaining a phase difference in any one of the complex pilot products of up to an absolute value of pi ($\pi$).

11. The receiver of claim 10, wherein the state machine is configured for initially setting the size of the prescribed group to eight (8) symbols.

12. The receiver of claim 7, wherein the state machine is configured for includes selectively discarding at least one symbol having been determined as having a signal to noise ratio below a prescribed level.

* * * * *